May 14, 1929.     A. BACALU     1,713,017
VEHICLE
Filed March 20, 1925
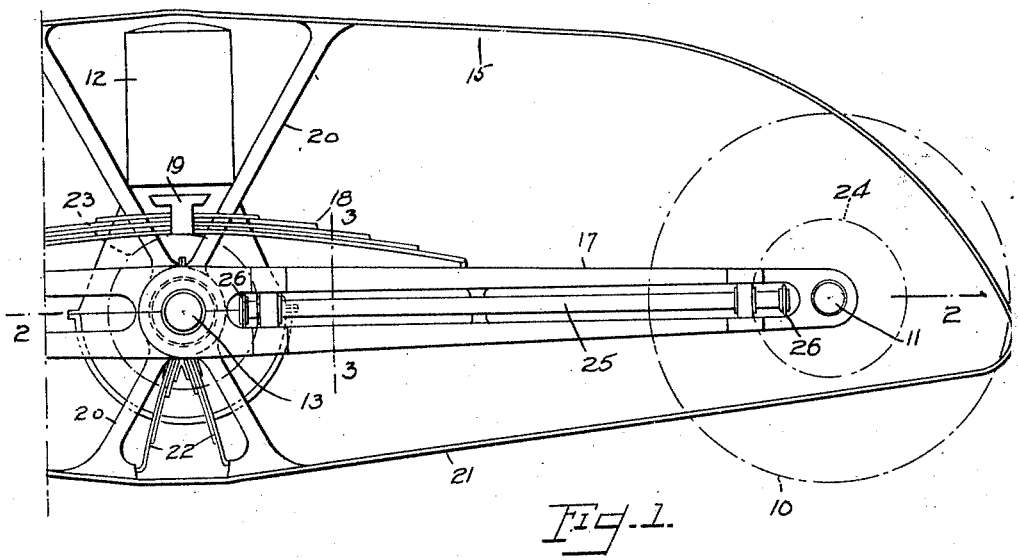
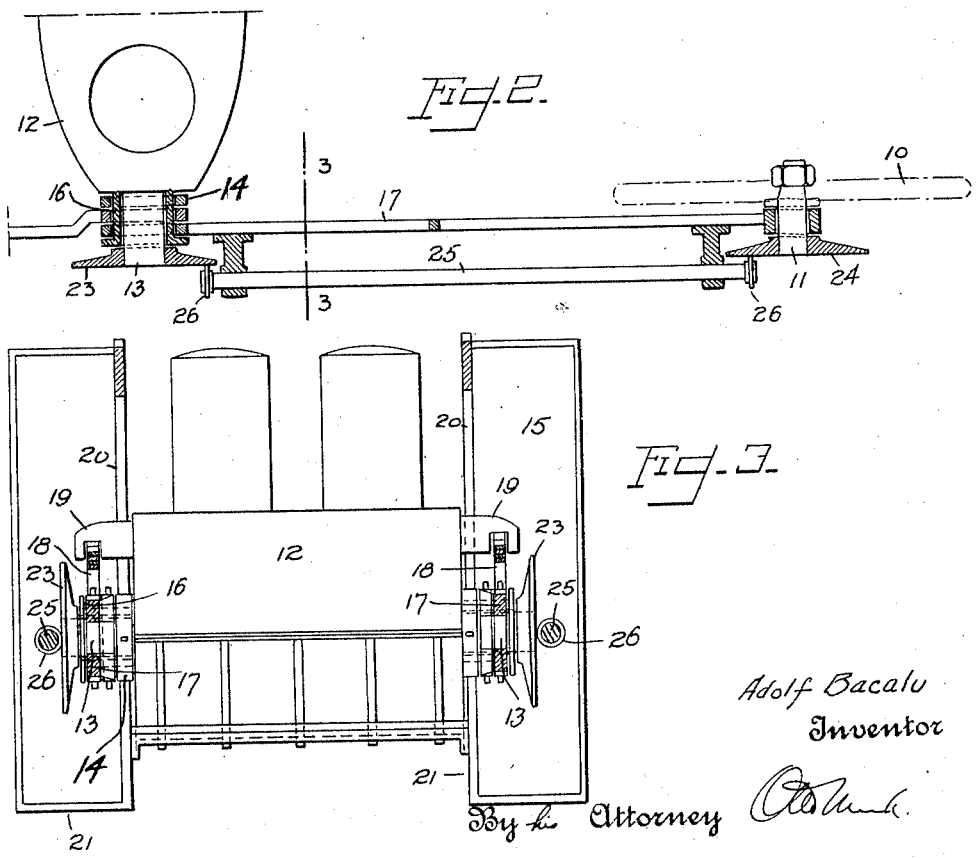
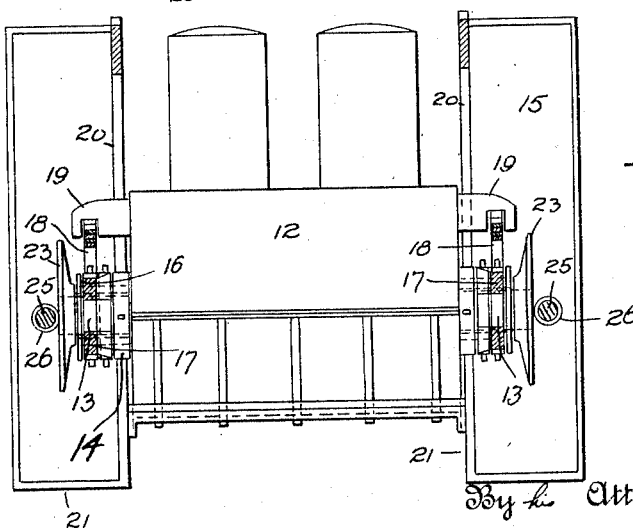
Adolf Bacalu
Inventor

Patented May 14, 1929.

1,713,017

UNITED STATES PATENT OFFICE.

ADOLF BACALU, OF BUCHAREST, RUMANIA.

VEHICLE.

Application filed March 20, 1925, Serial No. 17,141, and in Rumania March 20, 1924.

This invention relates to improvements in motor vehicles and has reference particularly to a resilient supporting element for a motor disposed midway between the front and rear set of wheels.

The object of the invention is to provide a vehicle construction of this character which will operate over very rough roads without transmitting any of the shocks to the engine and other parts of the vehicle body.

The invention is illustratively exemplified in the accompanying drawings, in which, Figure 1 is a side elevational view of the end of a vehicle showing my improved suspension arrangement; Figure 2 is a longitudinal sectional view taken on lines 2—2 of Figure 1; and Figure 3 is a transverse sectional view of the same taken on lines 3—3 of Figure 1.

Referring to the drawings 10 denotes a vehicle wheel, of which there are four arranged in the usual manner, mounted on an axle 11 disposed transversely of the vehicle. Located substantially midway of the front and rear axles 11 is the motor 12 having its drive shaft 13 projecting from opposite ends and supporting suitable brackets 14 forming parts of the skeleton frames 15 at opposite sides of the machine. The brackets 14 carry coaxially of the drive shaft 13 bearing pins 16, the latter being intended to provide pivots for the inner ends of arms or levers 17 which are pivoted at their outer ends on the front and rear axles 11 as illustrated in Figures 1 and 2. The front arm 17 is pivoted to the front wheel in the same manner as the rear arm is pivoted to the rear wheel.

The arms 17 at each side of the vehicle are normally held in alignment with each other by means of a set of leaf springs 18 the center of which is engaged under a hook or lug 19 integral with the end of the motor casing 12 and the outer ends bear downwardly, upon the upper edges of the arms 17. The frames 15 comprise spokes 20 which are radially disposed about the hubs or brackets 14 and which terminate in a continuous band 21 projecting from beyond the front axle to a point rearwardly of the rear axle. The frames 15 are held in balanced positions by springs 22 attached to the engine at their upper ends and at the lower ends bearing against the lower set of spokes 20.

The motor drive shaft 13 carries friction discs 23 and the axles carrying the wheels 10 are provided with similar discs 24. Power is transmitted from the discs 23 to discs 24 by a shaft 25 having its opposite ends provided with friction wheels 26 engaging the surfaces of the discs 23 and 24, as illustrated clearly in Figure 2.

In operation, it will be clear that shocks received by any one wheel or wheels will be taken up by one side of the springs 18 and will not be transmitted to the other parts of the vehicle. In other words each wheel 10, by reason of this construction, has full freedom to bounce independently of the other wheels, and the shock will thus be transmitted in a greatly reduced form to the vehicle body because of the fact that the wheel is rotatable about the pivot member 16 at the center of the vehicle, the amount of the rotation being limited by the spring 18.

Means for driving and steering the vehicle are not salient features of the invention, and accordingly the friction wheel transmission mechanism illustrated and described is merely illustrative of the driving possibilities. Similarly, steering mechanism, though not shown, may be associated with the vehicle in a variety of ways.

I claim:

1. In a vehicle, the combination with front and rear supporting wheels, of a transverse pivot member therebetween, arms each pivotally supported at opposite ends upon said member and one wheel respectively, and a vehicle body pivotally supported on said pivot member.

2. In a vehicle, the combination with front and rear supporting wheels, of a transverse pivot member therebetween, arms each pivotally supported at opposite ends upon said member and one wheel respectively, a vehicle body pivotally supported on said pivot member, and resilient means carried by the pivot member for yieldably retaining said vehicle body in normal position relative to the pivot member.

3. In a vehicle, the combination with front and rear supporting wheels, of a transverse pivot member therebetween, arms each pivotally supported at opposite ends upon said member and one wheel respectively, a driving shaft co-axial with said pivot member, and transmission means carried by at least one of said arms for operatively connecting the wheel at the end of said arm with said driving shaft.

4 In a motor vehicle, the combination with front and rear supporting wheels, of a driving motor therebetween having a crank shaft transversely of the vehicle, arms each pivotally mounted with respect to said shaft at one end of said arm and pivotally supported upon one wheel at the other end thereof, resilient means rigidly supported with respect to the motor for retaining said arms in normal position with respect to said shaft, and a vehicle body carried by said motor and pivotally mounted with respect to said shaft.

In testimony whereof I have signed my name to this specification

ADOLF BACALU.